Sept. 29, 1936. W. L. SUTTON 2,055,756
SPAR STRUCTURE
Filed April 15, 1933 2 Sheets-Sheet 1
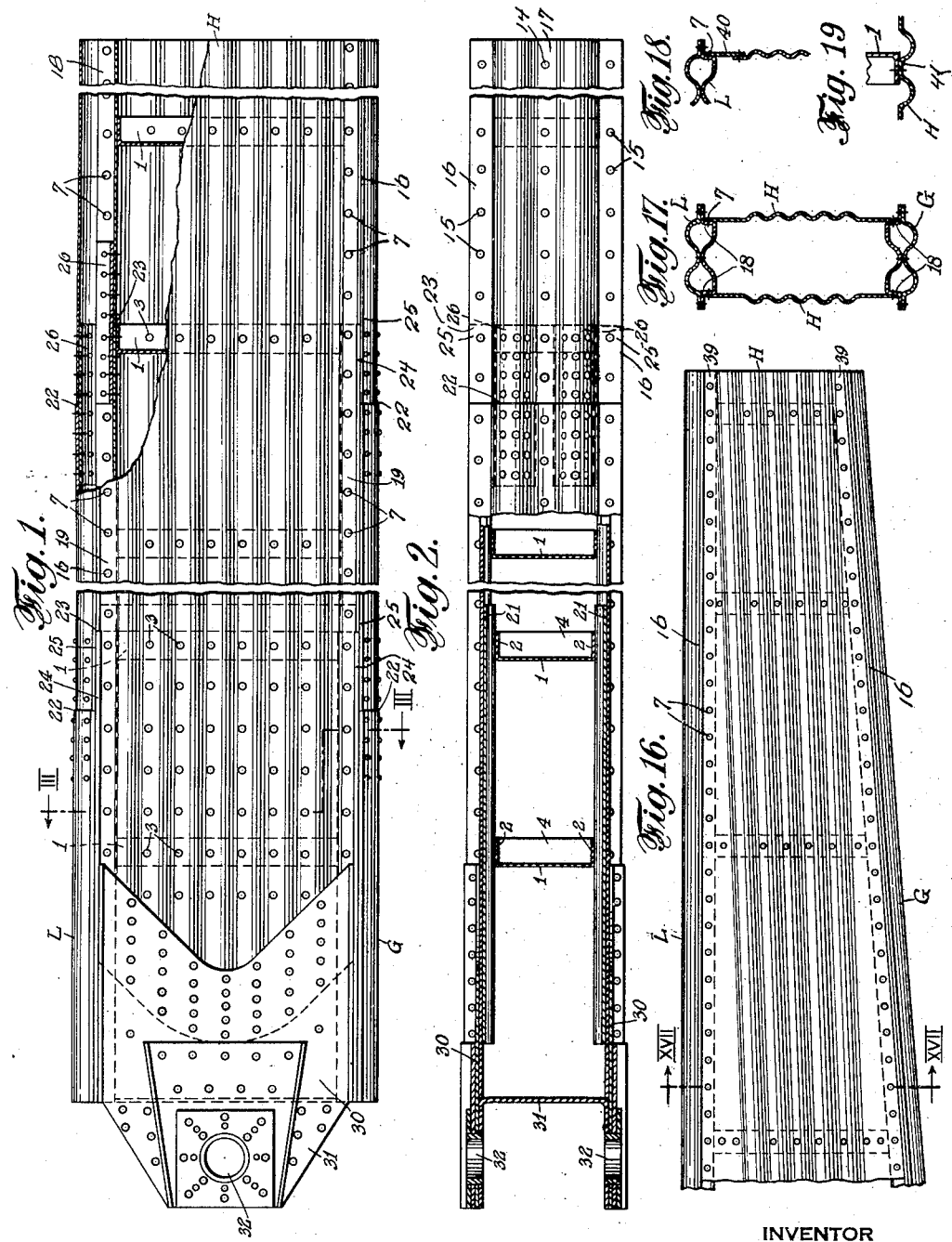
INVENTOR
WILSON L. SUTTON
BY
ATTORNEY

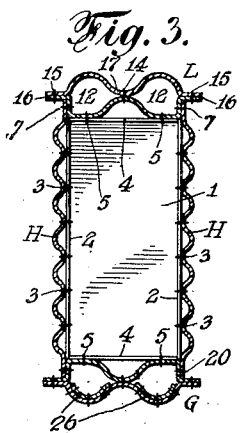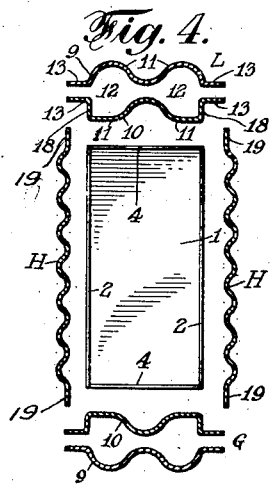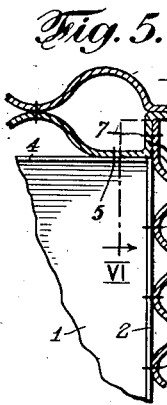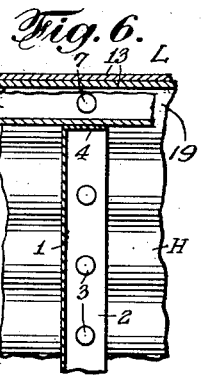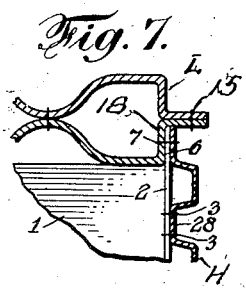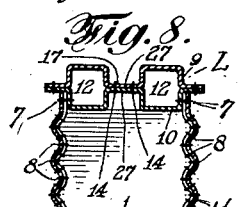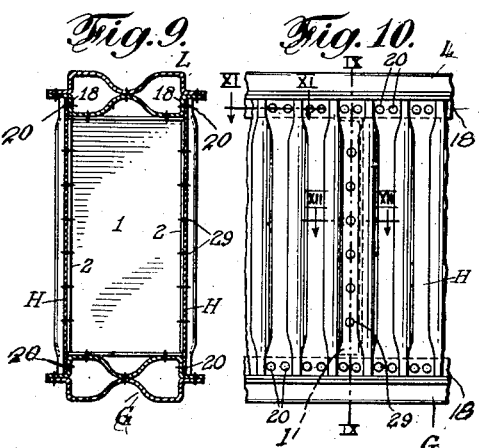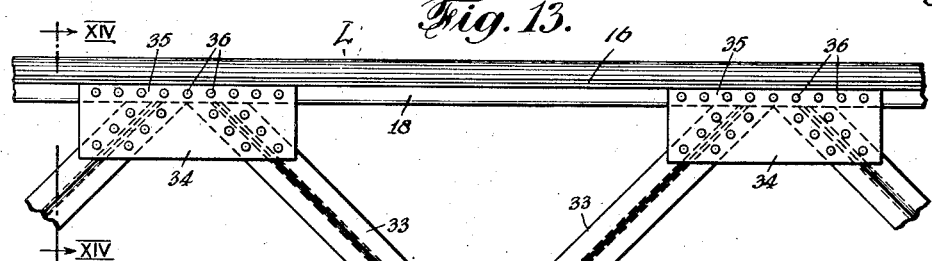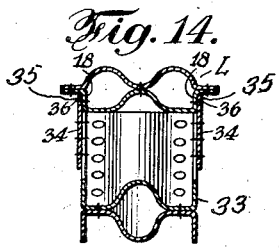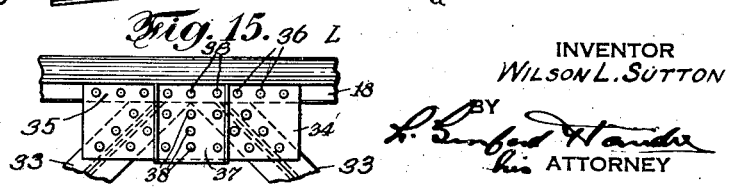
INVENTOR
WILSON L. SUTTON
BY
ATTORNEY Patented Sept. 29, 1936

2,055,756

UNITED STATES PATENT OFFICE 2,055,756

SPAR STRUCTURE

Wilson L. Sutton, Long Island, N. Y., assignor to Fleetwings, Inc., Garden City, N. Y., a corporation of Delaware Application April 15, 1933, Serial No. 666,305

5 Claims. (Cl. 189—37)

This invention relates to a spar structure and method of assembly, being in the nature of an improvement upon the invention disclosed in my co-pending application Serial No. 650,625, filed Jan. 7, 1933, now Patent No. 2,027,711.

An object of the present invention is to provide an improved construction of spar whereby the greatest possible strength is obtained in proportion to the weight of the spar thereby particularly adapting the spar to use in the construction of airplanes, airplane wings and in similar connections.

A further object is to so construct the spar that it will be of a practical form symmetrical and attractive in appearance and suitable for easy and inexpensive manufacture.

A more detailed object is to so construct the spar that it will be highly efficient in withstanding endwise tension and compression strains as well as vertical and lateral bending strains and shearing strains, and to otherwise construct the spar so that it will be as nearly as possible devoid of any localities subject to local failure or permanent wrinkling until full design load has been reached.

A further object is to so construct the spar that it will have an extremely high form factor and so that the center of gravity of its top and bottom chords respectively will be as far as possible removed above and below the neutral axis of the spar, considering the over-all heighth of the spar.

A further object is to so construct the top and bottom chords of the spar as to be of great strength and at the same time provide ideal localities for the attachment thereto of the web forming elements of the spar and of re-inforcing diaphragms if desired.

A further object is to so construct the top and bottom chords that they are equally adaptable to the attachment thereto of sheet metal webs or open trusses either diagonal or otherwise.

A further detailed object is to provide for the simple and efficient splicing together of portions of the chords lengthwise of the chords as may be desirable for the graduation of strength and weight outwardly from the point or points of support of the spar.

A further detailed object is to so form the parts as to enable the use of relatively larger, or a greater quantity of, rivets or spot welds, at different localities in the structure.

A further detailed object is to provide means for the more rigid fixing of the diaphragms into connection with the chords and webs of the structure.

A further object is to so construct the spar that it may be longitudinally tapered and yet include a longitudinally corrugated sheet metal web connecting its two chords.

A further object is to so construct and relate the parts so as to provide for a new method of assembling said parts to obtain a higher degree of efficiency.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a spar constructed in accordance with this invention, a part being broken away and shown in vertical section.

Fig. 2 is a top plan view, partly in horizontal section, of the structure seen in Fig. 1.

Fig. 3 is a transverse sectional view substantially on the plane of line III—III of Fig. 1, and looking in the direction of the arrows.

Fig. 4 is a view similar to Fig. 3, but showing the principal component parts of the spar as being disconnected and spaced so as to be more readily discernible to the observer.

Fig. 5 is an enlarged detail fragmentary sectional view showing the manner of connecting the chords with the webs and diaphragms employed.

Fig. 6 is a vertical sectional view on the plane of line VI—VI of Fig. 5, and looking in the direction of the arrows.

Fig. 7 is an enlarged detail fragmentary sectional view, similar to Fig. 5, but illustrating a slightly modified structure.

Fig. 8 is a transverse sectional view similar to the upper portion of Fig. 3, but illustrating a further modified construction of the parts.

Fig. 9 is a sectional view similar to Fig. 3, but showing a further modified construction of the parts, said view being taken upon the plane of line IX—IX of Fig. 10;

Fig. 10 is a fragmentary side elevational view, similar to a portion of Fig. 1, but showing the structure illustrated in Fig. 9.

Figs. 11 and 12 are fragmentary horizontal sectional views upon the planes of line XI—XI and XII—XII respectively of Fig. 10.

Fig. 13 is a side elevational view of a portion of the length of a truss type of spar embodying this invention.

Fig. 14 is a detail vertical sectional view upon the plane of line XIV—XIV of Fig. 13.

Fig. 15 is a side elevational view similar to a portion of Fig. 13, but illustrating the use of an additional re-inforcing element.

Fig. 16 is a view similar to Fig. 13, but showing a tapered box girder type of web having longitudinally extending corrugations therein.

Fig. 17 is a vertical sectional view upon the plane of line XVII—XVII of Fig. 16.

Fig. 18 is a fragmentary sectional view corresponding with a portion of Fig. 17, but illustrating a slightly modified construction of the web, and Fig. 19 is a fragmentary horizontal sectional view similar to Fig. 12 but illustrating a slightly modified form of corrugation.

Referring to the drawings for describing in detail the exemplary structures illustrated therein, and referring first to the structure Figs. 1 to 6, the reference characters L and G indicate respectively the top and bottom chords.

These chords are spaced apart and rigidly connected together by opposite side web members indicated by the reference characters H—H.

Interiorly of the girder is arranged a series of diaphragms as 1—1. These are spaced apart a suitable distance lengthwise of the spar and are rigidly connected with the side webs H—H and preferably also with the top and bottom chords.

Each diaphragm is formed with opposite side flanges as 2—2 resting against the inner surface of the webs H—H and fixed thereto as by rivets or spot welds as 3—3.

Each diaphragm is also preferably formed with top and bottom flanges as 4—4 resting against the inner surface of the chords L and G respectively and fixed thereto as by rivets or spot welds as 5—5.

If desired the side flanges 2 of these diaphragms may be extended at their ends, as indicated at 6 in Fig. 7, so as to project into the joint between the chords and the webs, in which case the diaphragms are additionaly secured to these elements as by the rivets or spot welds 7 forming said joint.

The side flanges 2 of the diaphragms may be straight and uncorrugated if desired in which case they will rest in contact with the corrugated surface of the webs only at the inwardly projecting ridges of the corrugations where they will be attached to said ridges by the rivets or welds 3, as above mentioned. But if preferred and found desirable they may be corrugated so as to follow the corrugated contour of the inner surface of the webs, in which instance they may be fastened to the material of the web by any desired number of rivets or spot welds, as indicated at 8—8 in Fig. 8.

The chords L and G each consists as before, of an outer member 9 and an inner member 10, both of which are symmetrically curved in cross section as by drawer rolling, to the same general contour, except as presently noted. The two members constituting the respective chords are positioned in reversed arrangement so that the concaved portions 11—11 face each other and define two hollow tubular spaces as 12—12 between the two members, the relatively convexed portions as 13—13 abutting together and being welded or riveted rigidly to each other both between the tubular portions 12—12, as indicated at 14, and outside said tubular portions as indicated at 15—15, thus making the two members serve as one single and complete chord unit substantially as in the previous application.

The convexed longitudinal portions 13 of the two members, outside the tubular portions 12—12, lie flat together in a plane midway between the extreme top and bottom surface planes of the concaved portions 11—11 and constitute double thickness re-inforcing ribs 16—16 extending longitudinally at the oposite marginal edges of the chords, while the convexed longitudinal portions of the two members intermediate the tubular portions 12—12 lie in the same horizontal plane with the outside re-inforcing ribs 16 and constitute a double thickness re-inforcing section 17 longitudinally along the median line of the chord.

The only difference as to the cross sectional contour of the two chord members 9 and 10 is that whereas the outer chord member 9 has its concaved portions 11—11 gracefully rounded in cross section, the inner member 10 is bent to provide opposite parallel wall parts as 18—18 adjacent to the portions 13, said wall parts 18 being thereby disposed so as to constitute highly desirable foundations to which to directly connect the web forming parts as H of the spar.

It is noted at this point that if desired the outer member 9 may be made of the same cross sectional contour as the inner member 10, for instance as indicated in the modifications Figs. 7, 8 and 9.

The webs H—H may be of any type, either of flat sheets, truss or corrugated. In the structure Figs. 1 to 6 they are of longitudinally corrugated sheet metal formed preferably by drawer rolling a thin sheet of metal to form corrugations having a ratio of pitch to depth varying from 3 to 4. At their top and bottom margins they are formed with relatively flat portions as 19—19 which engage flat against the wall parts 18 of the chords and are fixed thereto in a suitable manner as by the spot welds or rivets 7—7.

By fixing the marginal portions 19 of the webs directly to the parallel wall parts 18—18 of the chords, avoids necessity for the use of lateral flanges on the portions 19 and places the point of attachment between the webs and the chords almost directly in the stress plane of the webs instead of off-set as heretofore, thereby greatly strengthening the structure in the region of the joints between the webs and the chords.

The sheet metal employed in the formation of the webs may in some instances be the same as that employed in the formation of the chords, but usually the metal of the chords is somewhat heavier than that of the webs.

The diaphragms 1—1 may be formed in any appropriate manner. In Figs. 1 to 6 they each consist of a piece of sheet metal of suitable thickness, usually of about the same kind and thickness as that used in the webs H.

The diaphragms, collectively, of course greatly strengthen the spar in withstanding strains, particularly the strains due to end load and the strains tending to cause deflection due to vertical sheer, as before.

At the inner, or anchoring, end of the spar, or elsewhere as may be required where the strains are greatest, the webs, as heretofore, may have one or more additional thicknesses, as indicated at 21 in Fig. 2.

In order to provide for graduation in strength of the chords outwardly from the inner or anchoring end of the spar the present invention contemplates that both the inner and outer members as 9 and 10 of the chords may consist of a series of separate pieces placed end to end, said pieces being of successively reduced weight and strength outwardly from said point of support. The joints, as 22—22, between the pieces of the member 9 are carefully staggered with respect to the joints as 23—23 which occur between the successive pieces of the inner member 10, and this is important, since, as clearly illustrated in the drawings Figs. 1 and 2, portions as 24 of the inner member 10 are made to extend across the joints 22 of the outer member while portions as 25 of the outer member similarly extend across the joints 23 of the inner member, so that when these several parts are rigidly fastened together by the rivets or welds 14—15 a structure of great strength results without necessity for the use of splice plates.

This staggered arrangement of the joints also avoids the presence of any objectionable sharply defined region of weakness where the successive pieces of the chords are joined together, the decreasing strength of the chords being made so gradually that a proper distribution of strains is readily provided for.

It will be understood that the lapping parts 24 and 25 just referred to occur not only in the re-inforcing ribs 16 of the chords but also in the intermediate portion 17.

The portions of the chord members 9 and 10 which do not rest together for forming the double thickness re-inforcing parts 16 and 17, that is the concaved portions 11—11 of the chord members, may if desired be additionally secured together by the use of splice plates as 26—26, and these may be curved in cross section as may be required to properly fit to the contour of the chord members, as clearly indicated at the bottom of Fig. 3.

As illustrated in the modification Fig. 8 the two chord members 9 and 10 may be made of a more angular cross sectional contour than shown in the previous figures, the tubular portions 12—12 being in this instance of a general square contour. This arrangement has certain advantages amongst which is the fact that it provides a suitable broad expanse of flat wall portions as 27—27 intermediate the tubular portions 12—12 to receive more than a single row of the rivets or welds 14, thereby providing a double thickness reinforcing section 17 which is of great strength.

Likewise, as illustrated in the drawing Fig. 7, the corrugations provided in the webs H may if desired be of generally angular form in cross section instead of the smoothly rounding cross sectional contour shown in the previous figures, the angular form being desirable for some purposes, particularly since it provides relatively wider surface parts as 28 for resting against the flanges 2 of the diaphragms 1. These relatively wide portions 28 not only provide a more efficient bearing of the webs against the diaphragms but also, where desirable are capable of receiving more than a single rivet or weld 3 to bind the diaphragms and webs together.

As suggested in the modification Figs. 9 to 12, it is contemplated that if desired the webs H may be formed with transverse, or vertical, corrugations instead of the longitudinal, or horizontal, corrugations proposed in the previous figures.

Where the webs are vertically corrugated as in these Figs. 9 to 12 the vertical corrugations may if desired be of constant cross section from edge to edge of the webs and the edge portions of the webs may be fastened to the wall parts 18—18 of the chords by rivets or welds 20—20 where the inwardly convexed edge portions of the webs rest against the outer surfaces of the wall parts 18, but preferably the end portions of the corrugations, where they rest against the wall parts 18, are flattened out somewhat, as clearly shown in Figs. 9, 10, and 11, so as to give a broader bearing surface of the webs against the wall parts 18 and at the same time provide for the use of more than a single rivet or weld 20 between adjacent corrugations if found necessary in order to attain requisite strength for the joint.

The diaphragms 1 may have their side flanges 2 resting against inwardly convexed portions of the vertically corrugated webs and be attached to said inwardly convexed portions by rivets or welds, as indicated at 29 in Figs. 10 and 12.

Any suitable form of structure as may be found necessary and desirable may be connected to the inner or anchoring end portion of the spar, as heretofore. Such a structure, for instance to be employed in attaching the spar to the fuselage of an airplane, may consist of opposite heavy side plates as 30—30 having portions extending beyond the inner end of the spar and connected together by a U-shaped member 31, the extending portions being provided with bearing openings or the like as 32 for convenient attachment to the fuselage structure.

The illustrations Figs. 13 to 15 show how the spaced wall parts 18—18 of the chords L and G may be employed for the attachment of diagonal braces 33 when it is desired to use said chords as parts of a truss type of spar, it being seen that in this case separate splice plates as 34—34 are employed being fixed to the end portions of the diagonal braces, at opposite sides of said braces, and having portions as 35 extending straight into lapping engagement with said wall parts 18—18 and fixed thereto as by rivets or welds as 36—36 in the same manner as are the marginal parts of the webs H above set forth. The structure thus produced is of great strength, and if desired additional strength may be provided by arranging re-inforcing plates as 37 against the outer surfaces of the splice plates 34 and by fixing said re-inforcing plates 37 to the splice plates and to the walls 18 by suitable rivets or welds as 38—38, it being understood that these re-inforcing plates 37 may be employed on any or all of the splice plates 34 of Fig. 13, as may be found necessary or desirable.

In the modification Figs. 16 to 18 there is shown how longitudinally extending corrugations may be utilized in association with the other features of this invention where a tapered form of box girder is desired instead of the non-tapered form illustrated in Figs. 1 to 6.

By reference to Figs. 16 to 18 it will be seen that notwithstanding the tapered form of the spar the longitudinally extending corrugations are strictly in parallel relation to each other. The over-all height of the corrugated portion however is only that of the outermost or smaller end of the spar. At the outer or smaller end of the spar the top and bottom margins of the webs have flat portions 39, similar to the flat portions 19 heretofore described, of just sufficient extent to rest against and be fixed to the adjacent wall parts 18—18 of the chords. Toward the higher parts of the spar however the flat areas or portions 39 increase in height so that said flat portions are of a generally triangular form in side elevation and thereby always extend from the corrugated portions of the web to the opposite chords, as clearly indicated.

The extending triangular portions of the webs may be either integral parts of the webs as shown in Figs. 16 and 17, or they may consist of separately formed plates 40 securely fixed between the chords and the corrugated portions of the webs, as clearly indicated in Fig. 18.

Transversely corrugated webs H as illustrated in Figs. 9 to 12 may of course be employed in the construction of tapered spars whenever desired, such webs in this instance merely being themselves tapered lengthwise to correspond to the spacing of the chords at different points in the length of the spar.

The illustration Fig. 19 suggests a corrugation contour which may if desired be employed in either the longitudinal or the transverse corrugations it being noted that in this form of corrugation broad flat portions as 41 occur between each of the smoothly rounded convexed portions, the portions 41 providing broad bearing surfaces for attachment to the diaphragms, as well as to the wall parts 18 of the chords in case the corrugations extend transversely between the chords. This form of corrugation may in some instances provide ample space for receiving the rivets or welds 20, Fig. 10, without necessity for tapering off or otherwise changing the shape of the corrugations at the marginal edges of the web.

Extensive experiments show that a spar constructed in accordance with the provisions of this invention as herein disclosed is highly efficient against diagonal wrinkling and against failure at the junction between the webs and the chords and against failure of the chords themselves, under all loads within the design capacity of the spar and that this important result is largely due to the fact that the marginal edge portions of the webs lap directly the relatively vertical wall parts 18 of the chords and are fixed directly to said wall parts instead of being formed with lateral flanges connected to the outer flange portions of the chords as in the previous structure. Also to the fact that the rivets or welds 20 which fix the webs to the wall parts 16 stand transverse to the lines of strain so that the major strains thereon are shearing strains and are hence such as the rivets or welds and the adjacent structural parts are highly capable of withstanding.

The form of the several parts constituting the spar structure herein disclosed is important in providing such a relationship of said parts as enables the steps of assembly to be performed in an easy and entirely practical manner conducive to the securing of the highest degree of efficiency in the final result.

By making the several elements of the shape and construction shown it is possible to proceed with the steps of assembly as follows:

First, it is determined which of the chords L or G is the compression chord and which the tension chord, and this having been ascertained;

Second, the opposite webs H are riveted or welded to the opposite wall parts 18 of the inner chord member 10 of the compression chord throughout the length of said chord;

Third, the required number of diaphragms 1 are then placed in position between the opposite webs H and riveted or welded by their flanges 2 to the webs and by one of their flanges 4 to the portions 11 of the chord member 10.

The diaphragms could if preferred be riveted or welded to the chord 10 before attachment of the webs to said member 10, and should be so welded if extending parts 6 of the diaphragms are to be sandwiched between the webs and the wall parts 18.

Fourth, the outer member 9 of the compression chord is then placed in position and securely riveted or welded to the inner member 10 of said compression chord particularly along the intermediate row of rivets or welds 14, it being noted that up to this time neither member of the tension chord has yet been placed in position and that hence suitable free access is given to both the inner and outer sides of the compression chord for the easy and convenient placement of the rivets or welds 14. The two rows of rivets or welds 15 may also be applied conveniently at this time;

Fifth, the inner member 10 of the tension chord is then placed in position and has its wall parts 18 suitably riveted or welded to the adjacent marginal portions 19 of the webs, it being noted that the contour of the parts is such that at this time both sides of the joints between these parts is fully exposed and properly accessible for the riveting or welding of the joint;

Sixth, finally the outer member 9 of the tension chord is placed in position and secured by welds or rivets as 15 connecting together the convexed or flanged portions 13—13 of the inner and outer members of the tension chord.

In following this method of procedure of assembly of the parts the intermediate row of rivets or welds as 14 in the tension chord is omitted, as are also the rivet or weld connections between the inner member 10 of the tension chord and the adjacent flanges 4 of the diaphragms, and in this fact lies the desirability for having first determined which of the chords L and G is to be the compression chord and which the tension chord of the spar, for, as will be understood, the component parts of the compression chord, and the connections between said parts, are in use subjected to much more severe strains tending to disrupt said parts and their connections than are the parts and connections in the tension chord. The tension chord produced as the result of this method of assembly is amply capable of withstanding all strains to which it will be subjected in a spar structure which has its compression chord formed and assembled as per this method.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A spar structure comprising top and bottom chords and connecting means therefor, at least one of said chords consisting of an inner member and an outer member, each of said members in turn consisting of a plurality of separate pieces arranged end to end to complete the length of said members, said pieces successively being of relatively increased strength, the joints between the separate pieces of the outer member being staggered with respect to the joints between the separate pieces of the inner member so that the pieces of the outer member lap the joints of the inner member and the pieces of the inner member lap the joints of the outer member, and all of said lapping parts being rigidly connected together, whereby said mentioned chord is of progressively increased strength toward one of its ends.

2. In combination, a spar structure comprising top and bottom chords arranged closer together at one end than at the other so as to define a tapered spar, and opposite side webs fixed to said chords, and said side webs being formed with a group of longitudinally extending corrugations arranged in parallel relation to each other and defining a triangular portion of the web at at least one side of said group, said triangular portion being uncorrugated and extending between and having fixed connection with said corrugated portion and the adjacent chord.

3. In combination, a spar structure comprising top and bottom chords arranged closer together at one end than at the other so as to define a tapered spar, and opposite side webs fixed to said chords, and said side webs being formed with a group of longitudinally extending corrugations arranged in parallel relation to each other and defining a triangular portion of the web at at least one side of said group, said triangular portion consisting of a separately formed sheet of material uncorrugated and extending between and being fixedly connected with the corrugated portion and with the adjacent chord.

4. In combination, a spar structure comprising top and bottom chords and opposite side webs, said chords each comprising an inner and an outer elongated piece of sheet metal each piece being bent in cross-section so as to provide a central and opposite marginal strip portions extending longitudinally of the spar all in a common horizontal plane and two hollow rib portions projecting at one side of said plane separated by the central strip portion, the two rib portions of at least the inner piece of each chord being shaped each to provide a flat vertical wall portion extending along the length of the piece at the inner edges of the marginal strip portions of the piece, the two pieces of sheet metal of the respective chords being reversely positioned with their three strip portions abutting together in a common plane and with their rib portions projecting above and below said plane and co-acting to form two spaced tubes, means in each chord rigidly connecting the three strip portions of one piece with the corresponding portions of the other piece throughout their length where they abut so that each chord provides two tubular portions which are spaced apart at opposite sides of a double-thickness-metal connecting strip extending along the longitudinal vertical median line of the chord and each of which has a flat vertical wall portion at its outer side, the flat vertical wall portions of the two chords lying in common vertical planes spaced equi-distant at opposite sides of the vertical median line of the spar, and said opposite side webs having their upper and lower longitudinal marginal portions disposed substantially flat in vertical planes and lying substantially flat against the vertical wall portions of the chords respectively and rigidly fixed thereto by fastening means which interengage directly between said marginal portions and said vertical wall portions so as to be subject primarily only to shearing strains under load.

5. In combination, a spar structure comprising top and bottom chords, opposite side webs, and spaced diaphragms, said chords each comprising an inner and outer elongated piece of sheet metal each piece being bent in cross-section so as to provide a central and opposite marginal strip portions extending longitudinally of the spar all in a common horizontal plane and two hollow rib portions projecting at one side of said plane separated by the central strip portion, the two rib portions of at least the inner piece of each chord being shaped each to provide a flat vertical wall portion extending along the length of the piece at the inner edges of the marginal strip portions of the piece, the two pieces of sheet metal of the respective chords being reversely positioned with their three strip portions abutting together in a common plane and with their rib portions projecting above and below said plane and co-acting to form two spaced tubes, means in each chord rigidly connecting the three strip portions of one piece with the corresponding portions of the other piece throughout their length where they abut so that each chord provides two tubular portions which are spaced apart at opposite sides of a double-thickness-metal connecting strip extending along the longitudinal vertical median line of the chord and each of which has a flat vertical wall portion at its outer side, the flat vertical wall portions of the two chords lying in common vertical planes spaced equi-distant at opposite sides of the vertical median line of the spar, said opposite side webs having their upper and lower longitudinal marginal portions disposed flat in vertical planes and lying flat against the vertical wall portions of the chords respectively, said diaphragms having opposite side flanges thereon which are fixed to said opposite side webs and which are formed with extended ends continuing vertically into sandwiched relation between the marginal portions of the webs and the flat vertical wall portions of the chords and held fixed in said sandwiched relation by fastening means which interengage directly between said marginal portions of the webs said extended ends of the diaphragm flanges and said flat vertical wall portions of the chords so as to be subject primarily only to shearing strains under load.

WILSON L. SUTTON.